US011329944B2

(12) United States Patent
Schumacher et al.

(10) Patent No.: US 11,329,944 B2
(45) Date of Patent: May 10, 2022

(54) PRIORITIZING TRANSMISSIONS BASED ON USER ENGAGEMENT

(71) Applicant: Snap Inc., Santa Monica, CA (US)

(72) Inventors: Joshua Schumacher, Des Moines, WA (US); Bradley Baron, Seattle, WA (US); Benjamin Ralph Hollis, Seattle, WA (US); Thiago Hirai, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 65 days.

(21) Appl. No.: 16/808,183

(22) Filed: Mar. 3, 2020

(65) Prior Publication Data

US 2021/0281533 A1    Sep. 9, 2021

(51) Int. Cl.
| | |
|---|---|
| *H04L 12/58* | (2006.01) |
| *H04L 29/08* | (2006.01) |
| *H04L 29/06* | (2006.01) |
| *H04L 51/52* | (2022.01) |
| *H04L 51/224* | (2022.01) |
| *H04L 51/04* | (2022.01) |
| *H04L 67/50* | (2022.01) |
| *H04L 51/58* | (2022.01) |
| *H04L 51/56* | (2022.01) |
| *H04L 67/1095* | (2022.01) |
| *H04L 67/01* | (2022.01) |

(52) U.S. Cl.
CPC .............. *H04L 51/32* (2013.01); *H04L 51/04* (2013.01); *H04L 51/24* (2013.01); *H04L 51/36* (2013.01); *H04L 51/38* (2013.01); *H04L 67/1095* (2013.01); *H04L 67/22* (2013.01); *H04L 67/42* (2013.01)

(58) Field of Classification Search
CPC ......... H04L 51/32; H04L 51/04; H04L 51/36; H04L 51/38; H04L 51/24; H04L 67/22; H04L 67/1095; H04L 67/42; H04L 51/26; H04W 68/02; G06Q 10/107
See application file for complete search history.

(56) References Cited

U.S. PATENT DOCUMENTS

| | | | | |
|---|---|---|---|---|
| 9,356,806 | B2* | 5/2016 | Chowdhury | H04L 12/6418 |
| 9,959,551 | B1* | 5/2018 | Schermerhorn | H04L 12/1859 |
| 10,049,472 | B1* | 8/2018 | Croom | H04L 67/306 |
| 2013/0325948 | A1* | 12/2013 | Chen | H04L 51/32 |
| | | | | 709/204 |
| 2016/0044142 | A1* | 2/2016 | Hsiao | H04L 51/36 |
| | | | | 709/206 |
| 2019/0373071 | A1* | 12/2019 | Ramachandran | G06F 9/4451 |
| 2020/0125990 | A1* | 4/2020 | Burge | G06N 3/084 |
| 2020/0211035 | A1* | 7/2020 | Bluming | H04L 67/22 |

* cited by examiner

*Primary Examiner* — Caroline H Jahnige
(74) *Attorney, Agent, or Firm* — Schwegman Lundberg & Woessner, P.A.

(57) ABSTRACT

Systems and methods are provided for transmitting events. The systems and methods include operations for: receiving data indicating a level of user engagement with a messaging application for a given user; determining that the level of user engagement is below a specified threshold; prioritizing a plurality of events, associated with the messaging application, for transmission to a client device of the given user in response to determining that the level of user engagement is below the specified threshold; and transmitting a first event of the plurality of events to the client device based on prioritizing the plurality of events.

20 Claims, 7 Drawing Sheets

PRIORITIZING TRANSMISSIONS BASED ON USER ENGAGEMENT

TECHNICAL FIELD

The present disclosure generally relates to the technical field of social networks. In particular, the present embodiments are generally directed to managing message transmission.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
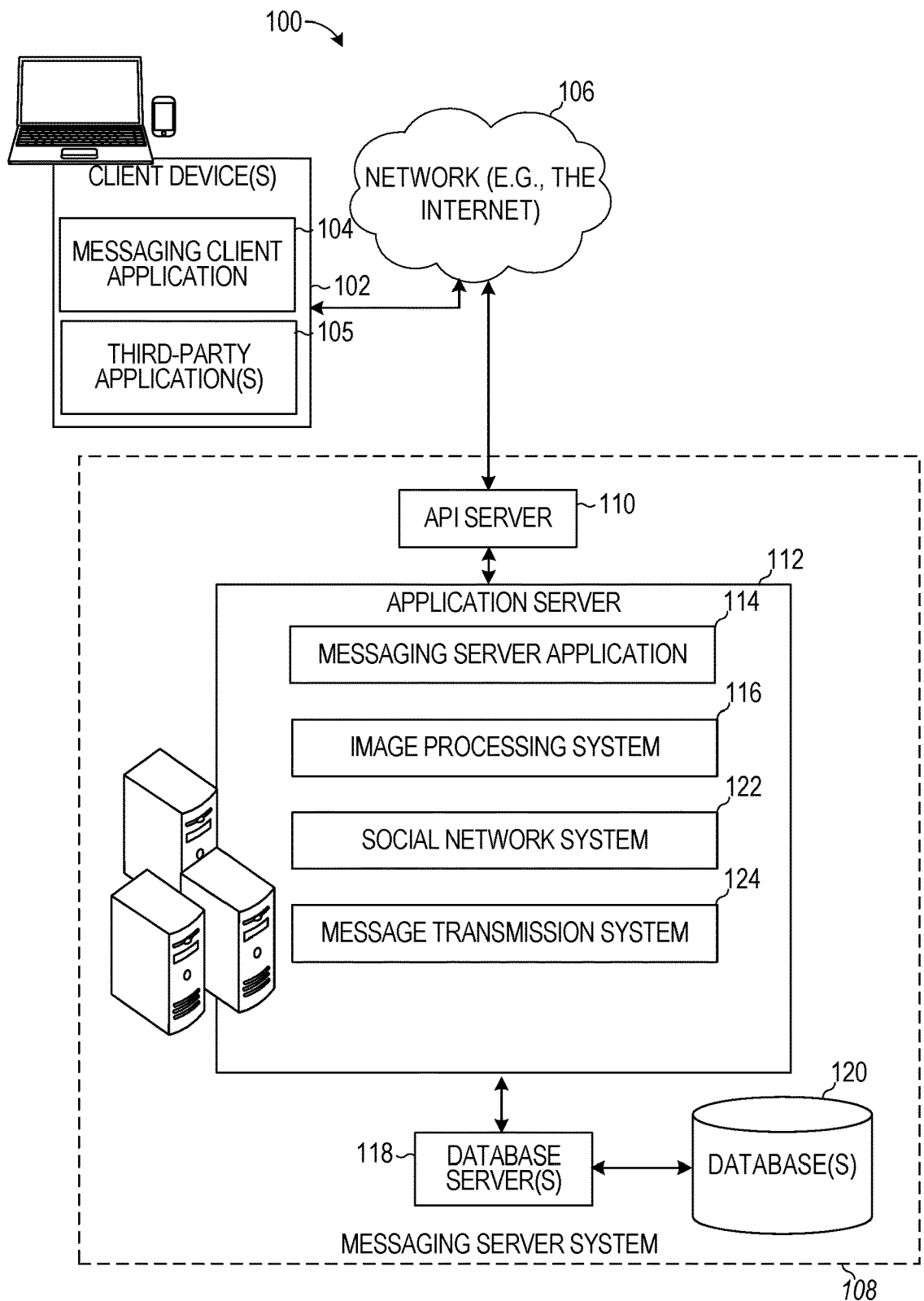
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on a user device, such as a mobile device. Such media content is typically exchanged in chat sessions between users. Sometimes users log on and log off a server that maintains the contents of the chat sessions. In order to ensure that the latest chat messages, that were exchanged in the chat session while the user device has been disconnected from the server, are presented to the user, a user device synchronizes with the server. There are many different ways to synchronize data between a user device and a server or of delivering messages to user devices. One way to deliver the messages is over a synchronization session which may occur periodically or in response to a specific user request. Another way is using a third-party push notification application to deliver the messages. Another way is to use a persistent bi-directional communication link between client devices to deliver the messages. Each different way to deliver the messages consumes a different amount of processing resources, battery, and network bandwidth and is associated with a different level of interruption to the users. Overusing one mechanism to deliver messages to the users can end up being counterproductive and frustrating to the users if the mechanism chosen to deliver the messages causes too much interruptions for the users. Selecting the optimal way to deliver messages to the users while minimizing the level of interruption of the users introduces various challenges.

The disclosed embodiments improve the efficiency of using the user device by providing a system that efficiently controls how and when certain information is sent to a user, particularly which events a delivered to a given user and what mode of transmission is used to deliver such events based on a level of user engagement. According to the disclosed system, the level of user engagement with a messaging application is determined based on received data. The received data is generated by analyzing various user activities the user performs on a given user device. The disclosed system prioritizes events, associated with the messaging application, for transmission to the given user device based on the level of user engagement. Specifically, a first event associated with a first priority may be selected for transmission to the given user device over a second message associated with a second priority if the level of user engagement falls below a specified threshold.

The first event is transmitted to the user device over one of a plurality of channels that is selected based on the level of user engagement. Such channels can include real-time peer-to-peer connections, push notifications, and information that is pulled from the server in a synchronization operation. In particular, a first channel associated with a first priority may be selected for transmitting the first event to the given client device over a second channel associated with a second priority if the level of user engagement falls below the specified threshold. In this way, the disclosed system prioritizes channels for transmission of events based on levels of user engagement and avoids overusing certain channels and overconsumption of resources associated with such channels. Namely, rather than sending all messages over a second channel that consumes more resources than a first channel, use of the second channel is preserved for transmitting messages that are assigned a high priority or if a user engagement falls below a threshold. This reduces costs, inefficient use of resources, and interruptions to users and increases the overall efficiencies of the system.

FIG. 1 is a block diagram showing an example messaging system 100 for exchanging data (e.g., messages and associated content) over a network 106. The messaging system 100 includes multiple client devices 102 (e.g., user devices), each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party applications) 105 or indirectly (e.g., via one or more servers) from the messaging client application 104 to the third-party application(s) 105.

The third-party application(s) 105 and the messaging client application 104 are applications that include a set of functions that allow the client device 102 to access a message transmission system 124. The third-party application 105 is an application that is separate and distinct from the messaging client application 104, The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104.

The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application. The third-party application 105 can be an operating system application or process, such as a push notification application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112. Any system, application, or component implemented by the application server 112 may be in the alternative or in addition be implemented on respective client devices 102. As an example, the message transmission system 124 may be implemented exclusive or in combination on the application server 112 or on a given client device 102.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message transmission system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message transmission system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by first entity. For example, the user data includes usernames, passwords, addresses, friends, activity information, preferences, videos or content consumed by the user, and so forth.

Figure 4:
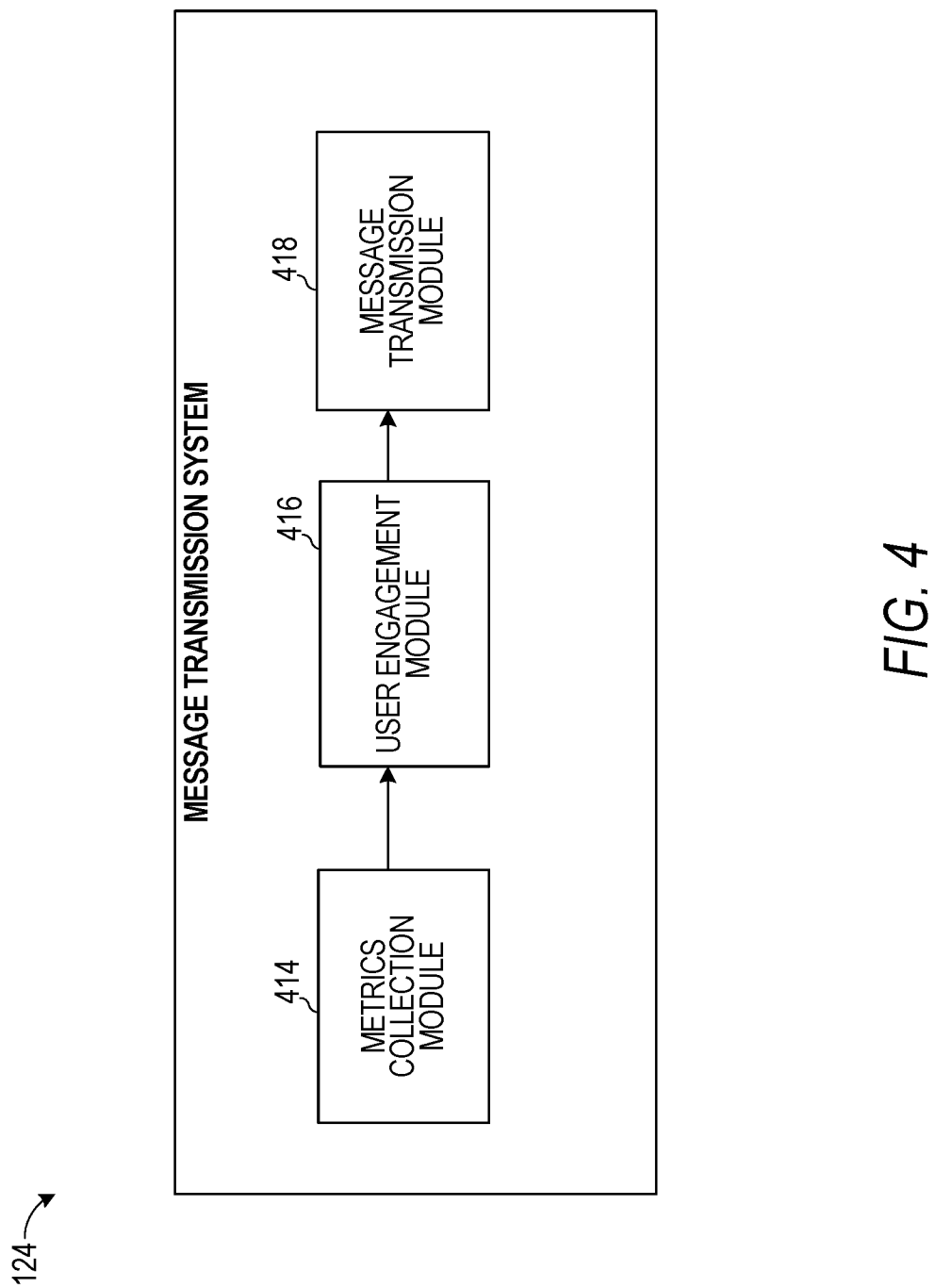
FIG. 4 is a block diagram showing an example message transmission system, according to example embodiments.

The application server 112 also includes a message transmission system 124 that manages transmission of events, conversations or messages (or combination thereof) exchanged in a communication session based on user engagement levels. Portions of the message transmission system 124 can be deployed or implemented by respective client devices 102 while other portions can be deployed and implemented by the server 112. FIG. 4 is a block diagram showing an example message transmission system 124, according to example embodiments. Message transmission system 124 includes a metrics collection module 414, a user engagement module 416, and a message transmission module 418.

Metrics collection module 414 includes one or more components or systems that run partially on the client devices 102 and partially on servers (e.g., messaging server system 108) to collect metrics about user activity. Also, metrics collection module 414 includes one or more components or systems that run exclusively on the client devices 102 or exclusively on the servers to collect metrics about user activity. The metrics collection module 414 analyzes user activities of each user of the messaging client application 104 across their respective client devices 102. As an example, the metrics collection module 414 measures at least one of frequency of loading the messaging client application 104 on the given client device 102, frequency of sending messages on the given client device 102 using the messaging client application 104, recency of accessing the messaging client application 104 on the given client device 102, likelihood of the given user uninstalling the messaging client application 104, likelihood of the given user muting notifications for the messaging client application 104, or viewing messages on the messaging client application 104 or other suitable activity.

The metrics collection module 414 can measure the frequency of loading the messaging client application 104 on the given client device 102 by accessing a set of timestamps indicating when an icon representing the messaging client application 104 was selected on the given client device 102. The metrics collection module 414 analyzes the set of timestamps to compute the frequency of loading the messaging client application 104. For example, the metrics collection module 414 determines that each timestamp is associated with a different day of the week. In this case, the metrics collection module 414 determines that the frequency is one day per week or daily. As another example, the metrics collection module 414 determines that each timestamp is associated with a different hour in a day. In this case, the metrics collection module 414 determines the frequency is hourly. A low frequency of loading the messaging client application 104 (e.g., once per week) may be indicative of a low level of user engagement. A medium frequency of loading the messaging client application 104 (e.g., once per day) may be indicative of a medium level of user engagement. A high frequency of loading the messaging client application 104 (e.g., once per hour) may be indicative of a high level of user engagement.

The metrics collection module 414 can measure the frequency of sending messages or viewing messages on the given client device 102 using the messaging client application 104 by accessing a set of timestamps indicating when the user of the client device 102 sent a message or viewed messages in one or more conversations in which the user participates in the messaging client application 104. The metrics collection module 414 analyzes the set of timestamps to compute the frequency of sending messages or viewing messages. For example, the metrics collection module 414 determines that each timestamp is associated with a different day of the week. In this case, the metrics collection module 414 determines that the frequency is one day per week or daily. As another example, the metrics collection module 414 determines that each timestamp is associated with a different hour in a day. In this case, the metrics collection module 414 determines the frequency is hourly. A low frequency of sending messages or viewing messages (e.g., once per week) may be indicative of a low level of user engagement. A medium frequency of sending messages or viewing messages (e.g., once per day) may be indicative of a medium level of user engagement. A high frequency of sending messages or viewing messages (e.g., once per hour) may be indicative of a high level of user engagement.

The metrics collection module 414 can measure the recency of accessing the messaging client application 104 on the given client device 102 by accessing a set of timestamps indicating when the user of the client device 102 last had an interaction within the messaging client application 104 after launching the messaging client application 104. The interaction can include viewing a video or other media item on the messaging client application 104, listening to an audio message, searching for content, browsing for content, updating a profile, or otherwise making any sort of selection of an option in the messaging client application 104. The metrics collection module 414 analyzes the set of timestamps to compute the frequency of accessing the messaging client application 104. For example, the metrics collection module 414 determines that each timestamp is associated with a different day of the week. In this case, the metrics collection module 414 determines that the frequency is one day per week or daily. As another example, the metrics collection module 414 determines that each timestamp is associated with a different hour in a day. In this case, the metrics collection module 414 determines the frequency is hourly. A low frequency of accessing the messaging client application 104 (e.g., once per week) may be indicative of a low level of user engagement. A medium frequency of accessing the messaging client application 104 (e.g., once per day) may be indicative of a medium level of user engagement. A high frequency of accessing the messaging client application 104 (e.g., once per hour) may be indicative of a high level of user engagement.

The metrics collection module 414 can measure the likelihood of the given user uninstalling the messaging client application 104 from the client device 102 of the given user. The metrics collection module 414 may analyze patterns of behavior of the given user and compare such patterns against patterns of behavior of various other users who have previously uninstalled the messaging client application 104. If none of the patterns of behavior of the given user matches the patterns of behavior of the various other users, a low likelihood of the given user uninstalling the messaging client application 104 may be determined. If a first number or amount of the patterns of behavior of the given user matches the patterns of behavior of the various other users, a medium likelihood of the given user uninstalling the messaging client application 104 may be determined. If a second number or amount, greater than the first number of amount, of the patterns of behavior of the given user matches the patterns of behavior of the various other users, a high likelihood of the given user uninstalling the messaging client application 104 may be determined.

The metrics collection module 414 can measure the likelihood of the given user muting notifications for the messaging client application 104. The metrics collection module 414 may analyze patterns of behavior of the given user and compare such patterns against patterns of behavior of various other users who have previously muting notifications for the messaging client application 104. If none of the patterns of behavior of the given user matches the patterns of behavior of the various other users, a low likelihood of the given user muting notifications for the messaging client application 104 may be determined. If a first number or amount of the patterns of behavior of the given user matches the patterns of behavior of the various other users, a medium likelihood of the given user muting notifications for the messaging client application 104 may be determined. If a second number or amount, greater than the first number of amount, of the patterns of behavior of the given user matches the patterns of behavior of the various other users, a high likelihood of the given user muting notifications for the messaging client application 104 may be determined.

The metrics collection module 414 provides the data associated with the user activity to a central processing system. The central processing system may be implemented by application server 112 or on a third-party system or combination thereof. The central processing system applies one or more models to the collection of user activity to generate a level of user engagement for each user of the messaging client application 104. The user engagement module 416 receives the level of user engagement for each user of the messaging client application 104. The user engagement module 416 selectively and dynamically processes messages or events (or both) for transmission to users based on the level of user engagement.

For example, the user engagement module 416 selects events for transmission to a user based on a priority of the events, such that only important events (or events of a certain type) are transmitted to a user who is associated with a low level of user engagement or such that important events (or only events of a certain type) are transmitted prior to less important events to a user who is associated with a low level of user engagement.

As another example, the user engagement module 416 selects a mode of transmission of events to a given user of a client device 102 based on the level of user engagement. Specifically, if the level of user engagement falls below the specified threshold, the user engagement module 416 instructs the message transmission module 418 to use a first mode of transmission (e.g., a first channel) to transmit one or more events to the given client device 102. If the level of user engagement does not fall below the specified threshold, the user engagement module 416 instructs the message transmission module 418 to maintain a second mode of transmission (e.g., a second channel) to transmit one or more events to the given client device 102. In some cases, the first mode of transmission is associated with a higher cost and consumes a greater number of resources than the second mode of transmission. In some cases, the first mode of transmission is operated or includes using a third-party application (e.g., a push notification application) and the second mode of transmission is operated by the entity of the messaging client application 104.

In some cases, the user engagement module 416 determines, based on the data received from the central processing system, that delivering more than a threshold number of events to the given client device 102 within a given period of time increases a likelihood of the given user uninstalling the messaging client application 104 or muting notifications for the messaging client application 104. Specifically, the user engagement module 416 may analyze patterns of behavior of various users to determine that after having more than twenty messages delivered in a given hour to the users, the users either uninstalled the messaging client application 104 or muted notifications (permanently or temporarily) for the messaging client application 104. Based on this analysis, if the user engagement module 416 determines that the number of messages or events that have been delivered to the user of the client device 102 is approaching the threshold number (e.g., 15 messages have already been sent within the hour), the user engagement module 416 may instruct the message transmission module 418 to prevent transmitting further events or messages to the given client device 102.

In some cases, the user engagement module 416 instructs the message transmission module 418 to delay sending further messages or events for a specified interval (e.g., two-hour delay). In some cases, the user engagement module 416 instructs the message transmission module 418 to select an alternate transmission mode for sending further messages or events to the given client device 102. For example, the user engagement module 416 determines that the past 15 messages or events were transmitted using a second channel (e.g., via a push notification application or a channel with a first quality of service or first likelihood of message delivery). In such cases, the user engagement module 416 instructs the message transmission module 418 to send further messages or events to the given client device 102 via a first or third channel (e.g., via a persistent bi-directional communication link between client devices 102 or a channel with a second quality of service or second likelihood of message delivery lower than the first quality of service or first likelihood of message delivery).

The user engagement module 416 may determine whether the level of user engagement falls below a specified threshold. In some embodiments, the level of user engagement may be one of several values. A first value of the several values indicates the given user is unengaged. A second value of the several values indicates the given user has low engagement. A third value of the several values indicates the given user has medium engagement. A fourth value of the several values indicates the given user has high engagement. In some cases, the first value is lower than the second value, the second value is lower than the third value, and the third value is lower than the fourth value. In some cases, the specified threshold includes the second value. In this case, the user engagement module 416 determines that the level of user engagement falls below the specified threshold when the value of the user engagement is lower than or equal to the second value.

To identify which events or messages in conversations are important to prioritize events or messages based on level of user engagement, the client device 102 or the application server 112 (or both) employs a model. In one example, the model includes a set of rules that specify parameters for selecting or identifying messages that are important. For example, a first rule or parameter may indicate that a conversation that includes a set of messages that include images or videos have a higher priority than messages that only include text. This is because the images or videos may form part of a story and need to be viewed in sequence. In such cases, the first rule specifies that the first image or video that was exchanged in the given conversation after the last time the given client device 102 synchronized its content with the server be identified as more important and be associated with a higher priority than other messages in the conversation that were exchanged after the last time the given client device 102 synchronized with the server. Namely, rather than selecting the last message exchanged in the conversation as being the most important and for transmission to the client device 102, the server 112 selects the first message in a sequence of messages that were exchanged after the given client device 102 last synchronized with the server and that includes images or videos. The server 112 may identify several messages that each include images or videos and may select the first of the several messages (e.g., the message with the earliest timestamp) as being the most important and for transmission to the client device 102 based on the engagement level falling below a threshold.

In some cases, a second rule or parameter indicates that messages that include video and audio are more important than messages that include video and no audio. In such cases, the second rule specifies that the first image or video with audio that was exchanged in the given conversation after the last time the given client device 102 synchronized its content with the server be identified as more important than a second image or video without audio in the conversation that was exchanged after the last time the given client device 102 synchronized with the server. Namely, rather than selecting the last message exchanged in the conversation as being the most important and for transmission to the client device 102 based on the engagement level falling below a threshold, the server 112 selects the first message in a sequence of messages that were exchanged after the given client device 102 last synchronized with the server and that includes images or videos with audio over messages that include images and videos without audio.

In some cases, a machine learning model (e.g., a neural network) is used to identify patterns of user behavior that indicate a likelihood that a user is interested in a conversation or that indicate a likelihood that one message in a conversation is more important than another message. In some circumstances, the client device 102 or server 112 (or both) generates and trains a machine learning model on a per user basis. The message transmission system 124 applies the trained machine learning model to the set of messages that are received in one or more conversations to identify a conversation or messages (or both) that have a high likelihood that the user is interested in accessing (e.g., a likelihood value that exceeds a threshold). The trained machine learning model can generate a score that indicates the likelihood for each conversation or for each message. The likelihood is then used to associate priorities or priority levels to each message or event that is to be transmitted to the client device 102.

In some embodiments, the user engagement module 416 selects messages or events (or both) for transmission to users based on a level of user engagement determined for such users. For example, the user engagement module 416 selects a first message or event associated with a first level of priority over a second message or event associated with a second level of priority in response to determining that the level of user engagement falls below a specified threshold. The second level of priority may be lower than the first level of priority. Specifically, rather than sending the second message, by default, to the given user which may be the next sequentially received message in the conversation, the user engagement module 416 selects the first message for transmission if the user engagement has fallen below a specified threshold. The first message may be determined to be of greater importance than the second message and may increase the likelihood of user engagement with the messaging client application 104. In some cases, the first message may be a message that was already delivered to the given user at a previous time. In this case, the first message may be sent to the given user again in response to determining that the user engagement level has fallen below a specified threshold. In some cases, if the first message was previously sent to the given user over a first mode of transmission, the user engagement module 416 may cause the first message to be sent to the given user again using a different mode of transmission (e.g., a different channel) in response to determining that the user engagement level has fallen below a specified threshold.

In some cases, the message transmission module 418 transmits events (e.g., messages) that are directed to a user of a given client device 102 over a plurality of channels. For example, the message transmission module 418 receives events over a first channel that includes a pull mechanism (e.g., when the client device 102 performs a synchronization operation with the server 112). Such events that are received in the pull mechanism may include messages that were exchanged in a conversation in which a user of the client device 102 is involved after the last time the client device 102 synchronized its data with the server. Such events are received by the client device 102 from the server 112 in response to a specific request by the client device 102 to perform a synchronization operation.

As another example, the message transmission module 418 transmits events (e.g., messages) over a second channel that includes a persistent bi-directional peer-to-peer link between the client device 102 of the user and one or more other client devices 102 of other users which are involved in a conversation with the user. As another example, the message transmission module 418 transmits events (e.g., messages) over a third channel that includes a push mechanism. Specifically, the client device 102 may include a push notification application that is native to the operating system of the client device 102 (e.g., a third-party push notification application). The push notification application may receive messages associated with a conversation of the messaging client application 104. The push notification application may provide the messages to the messaging client application 104 (e.g., to the communication session module 414) which then processes the messages for display in a summary view, or in a conversation view, or both.

In some cases, messages or events (or both) received by the push notification application are instantly presented to the user of the client device 102 concurrently with being received from the message transmission module 418. The events received over the first, second and third channels may be of the same type, of different types, or of a combination of the same and different types.

In some cases, the second channel is exclusively used to exchange presence messages or information (e.g., presence events). Presence messages include transient information or ephemeral information representing activities of various participants in a conversation. As an example, the presence messages indicate whether a given user in the conversation is typing, erasing, or viewing a message in a conversation.

The user engagement module 416 may instruct the message transmission module 418 to select one of the first, second, and third channel as a mode of transmission of an event to a given client device 102 based on the level of user engagement. Specifically, the user engagement module 416 may assign different levels of priority to each of the channels. As an example, the user engagement module 416 may assign a first level of priority to the first channel, a second level of priority to the second channel, and a third level of priority to the third channel. The first level of priority is lower than the second level of priority which is lower than the third level of priority. The user engagement module 416 may determine that the level of user engagement has fallen below a specified threshold. In response, the user engagement module 416 instructs the message transmission module 418 to delivery subsequent messages or a threshold number of subsequent messages using a channel that is associated with a higher priority than a channel that is currently used or a default channel. As an example, a first message or first event is, by default, sent to the client device 102 over the second channel associated with a second level of priority. After the first message or first event is sent to the client device 102, the user engagement module 416 determines that the level of user engagement has fallen below a specified threshold. In response to the user engagement module 416 instructs the message transmission module 418 to use a first channel associated with a first level of priority instead of the second channel for sending a second message or second event that is directed to a user of the client device 102 and that is received after the first message or first event. Because the first channel is associated with a higher likelihood of delivery or a higher quality of service, the likelihood that the user engagement level will increase is higher if the second message or event is sent via the first channel instead of the second channel. Subsequently, if the user engagement increases above the specified threshold, a third message or event that follows the second message may resume being transmitted via the second channel instead of the first channel. In this way, overuse of channels that consume a great deal of resources is avoided and limited to being used to reach users who are determined to have a low level of user engagement with the messaging client application 104.

Figure 2:
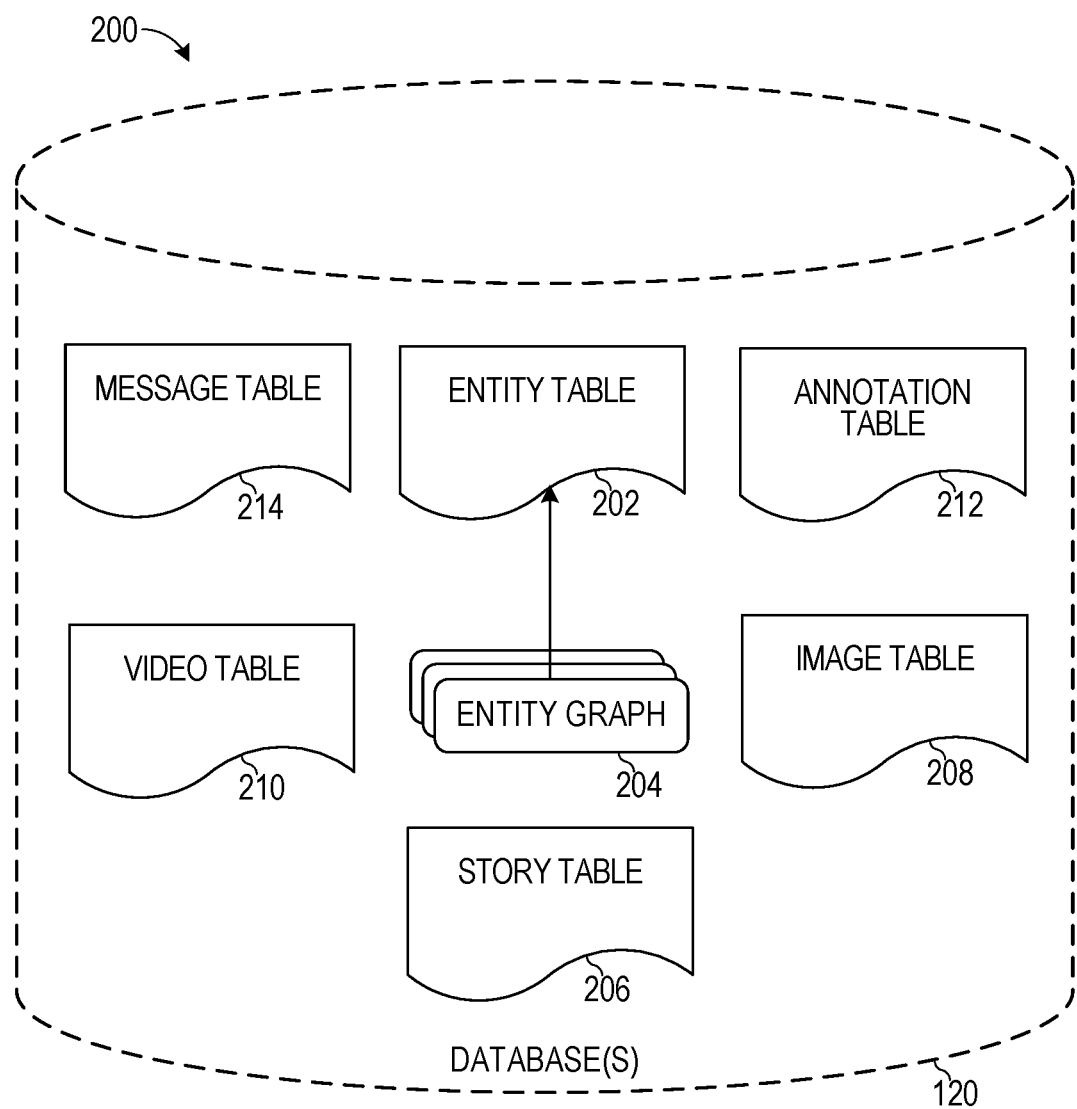
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) or images (for which data is stored in an image table 208) or both. Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
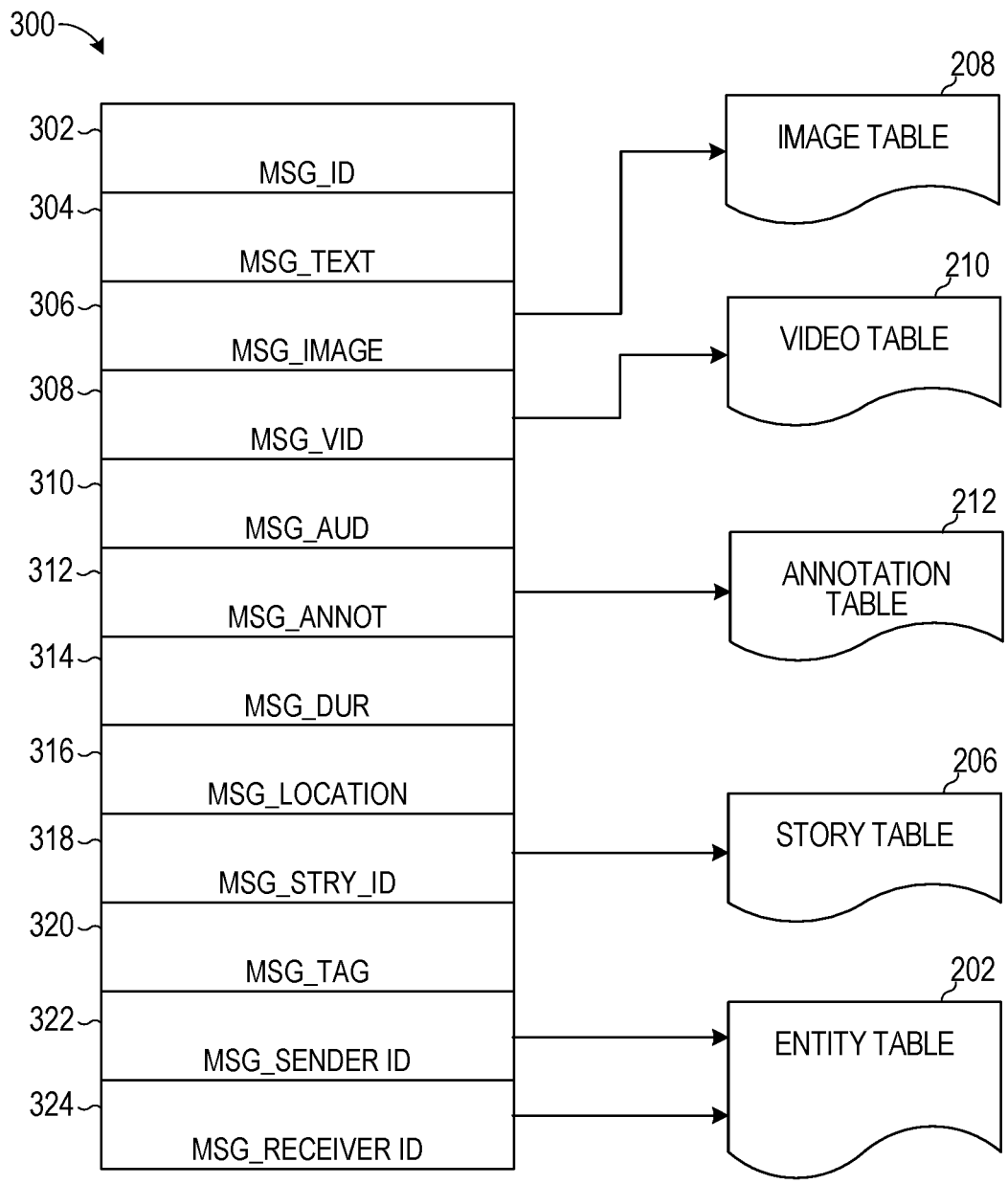
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 5:
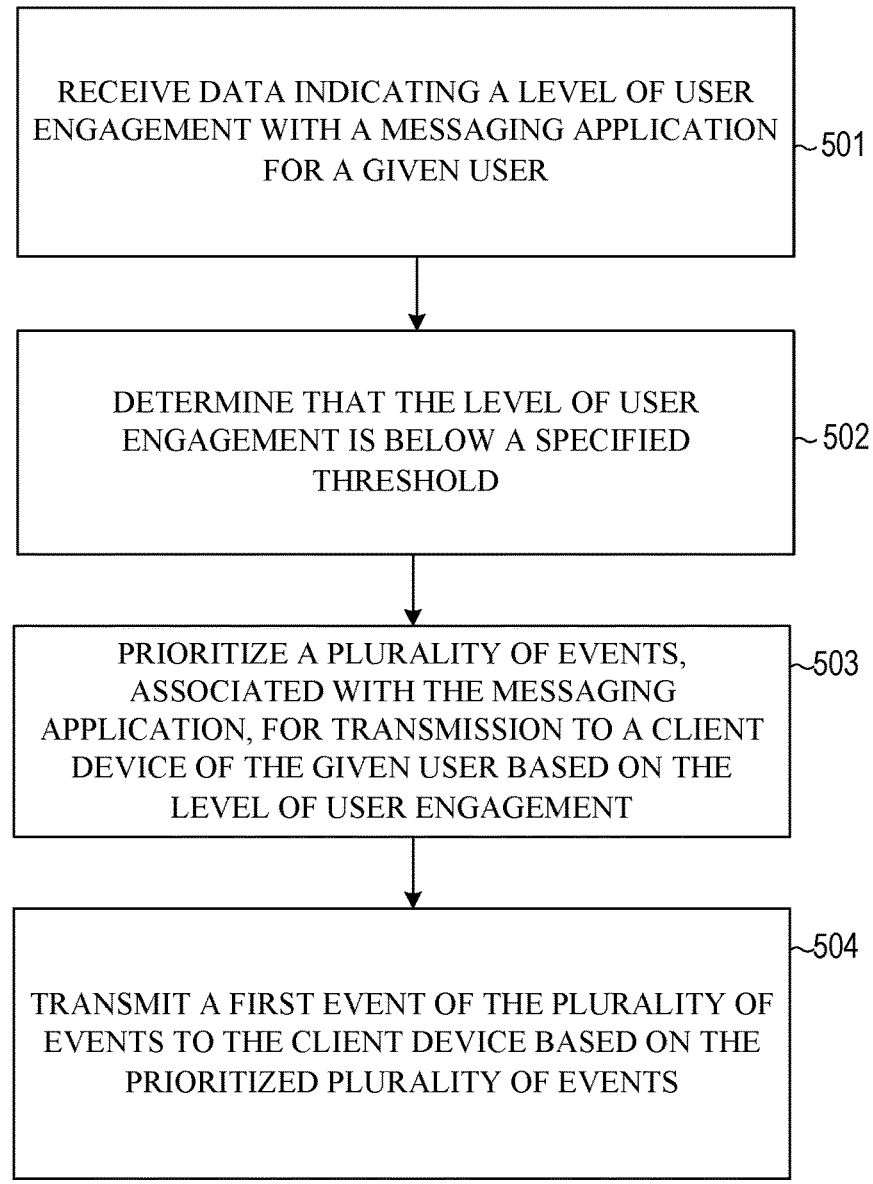
FIG. 5 is a flowchart illustrating example operations of the message transmission system, according to example embodiments.

FIG. 5 is a flowchart illustrating example operations of the message transmission system 124 in performing process 500, according to example embodiments. The process 500 may be embodied in computer-readable instructions for execution by one or more processors such that the operations of the process 500 may be performed in part or in whole by the functional components of the messaging server system 108, client device 102, or third-party application 105 or combination thereof; accordingly, the process 500 is described below by way of example with reference thereto. In other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, a computing system (e.g., message transmission system 124) receives data indicating a level of user engagement with a messaging application for a given user. For example, the user engagement module 416 receives data indicating a user engagement level from the metrics collection module 414. The metrics collection module 414 generates the metrics of user engagement by monitoring various user activities performed by users on respective client devices 102 and applying user engagement models to the activities.

At operation 502, the computing system determines that the level of user engagement is below a specified threshold. For example, the user engagement module 416 compares a value of the level of user engagement to a value of a threshold to determine whether the value of the level of user engagement (e.g., medium level of engagement) is lower than a value of the threshold.

At operation 503, the computing system prioritizes a plurality of events, associated with the messaging application, for transmission to a client device 102 of the given user based on or in response to determining that the level of user engagement is below the specified threshold. For example, the user engagement module 416 assigns priorities to events or channels (or both) based on the level of user engagement.

At operation 504, the computing system transmits a first event of the plurality of events to the client device based on prioritizing the plurality of events. For example, the user engagement module 416 instructs the message transmission module 418 to send an event or message to a given client device 102 over one or more channels. Specifically, the user engagement module 416 selects a first message with a first priority that is greater than a priority of a second message for transmission to the client device 102. The user engagement module 416 selects a first channel associated with a first priority that is greater than a priority of a second channel for use in transmitting a given event or message to the client device 102.

Figure 6:
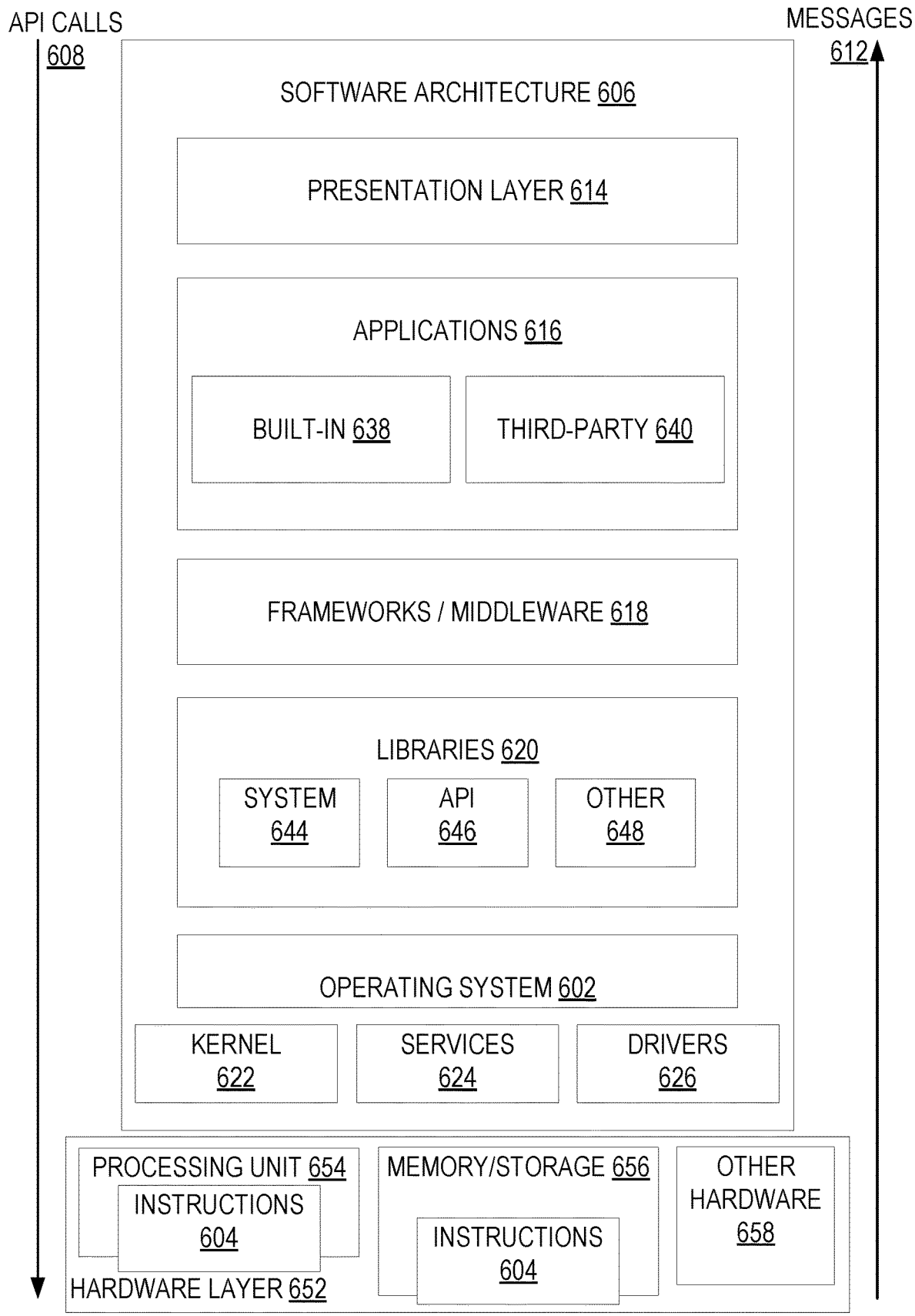
FIG. 6 is a block diagram illustrating a representative software architecture, which may be used in conjunction with various hardware architectures herein described, according to example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphical user interface functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
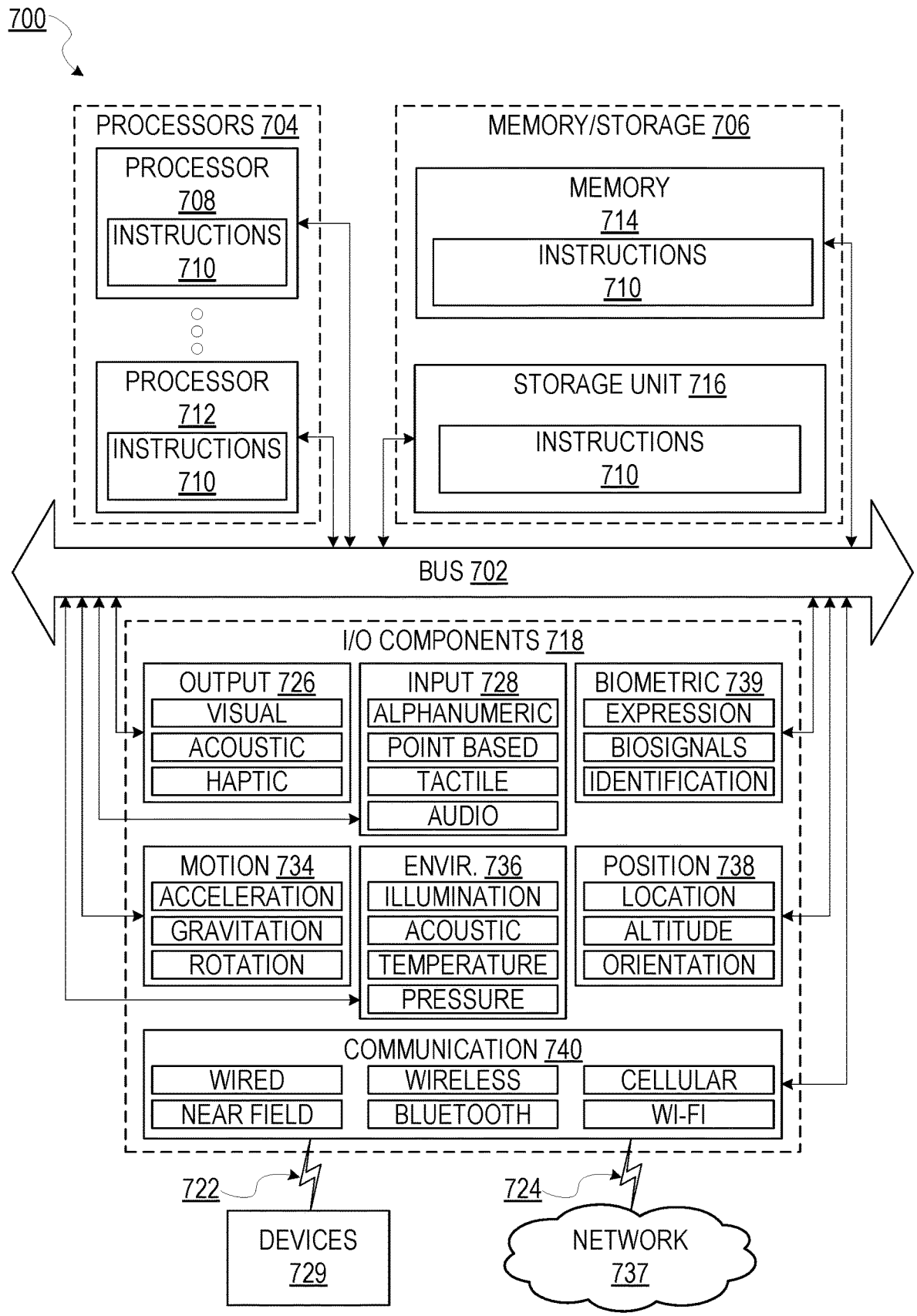
FIG. 7 is a block diagram illustrating components of a machine able to read instructions from a machine-readable medium (e.g., a machine-readable storage medium) and perform any one or more of the methodologies discussed herein, according to example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor 708 with a single core, a single processor 708 with multiple cores (e.g., a multi-core processor), multiple processors 708, 712 with a single core, multiple processors 708, 712 with multiple cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 729 may be another machine 700 or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting a NFC beacon signal that may indicate a particular location, and so forth.

Glossary:

"CARRIER SIGNAL," in this context, refers to any intangible medium that is capable of storing, encoding, or carrying transitory or non-transitory instructions 710 for execution by the machine 700, and includes digital or analog communications signals or other intangible medium to facilitate communication of such instructions 710. Instructions 710 may be transmitted or received over the network 106 using a transitory or non-transitory transmission medium via a network interface device and using any one of a number of well-known transfer protocols.

"CLIENT DEVICE," in this context, refers to any machine 700 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPREMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 708 or other programmable processor. Once configured by such software, hardware components become specific machines (or specific components of a machine 700) uniquely tailored to perform the configured functions and are no longer general-purpose processors 708. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor 708 or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 708 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 106 (e.g., the Internet) and via one or more appropriate interfaces (e.g., an API). The performance of certain of the operations may be distributed among the processors, not only residing within a single machine 700, but deployed across a number of machines. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR," in this context, refers to any circuit or virtual circuit (a physical circuit emulated by logic executing on an actual processor 708) that manipulates data values according to control signals (e.g., "commands," "op codes," "machine code," etc.) and which produces corresponding output signals that are applied to operate a machine 700. A processor 708 may, for example, be a CPU, a RISC processor, a CISC processor, a GPU, a DSP, an ASIC, a RFIC or any combination thereof. A processor 708 may further be a multi-core processor having two or more independent processors 704 (sometimes referred to as "cores") that may execute instructions 710 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    receiving, by one or more processors, data indicating a level of user engagement with a messaging application for a given user;
        determining that the level of user engagement is below a specified threshold;
    prioritizing, using a trained machine learning model, a plurality of events, associated with the messaging application, for transmission to a client device of the given user in response to determining that the level of user engagement is below the specified threshold;
    in response to determining that the level of user engagement is below the specified threshold,
    selecting a first channel of a plurality of channels instead of a second channel of the plurality of channels over which to transmit one or more events of the plurality of events based on the first channel consuming a greater amount of resources than the second channel;
    in response to determining based on the data that delivering more than a threshold number of events to the client device within a given period of time increases a likelihood of the messaging application being uninstalled or a notification for the messaging application being muted, preventing or delaying transmission of a first event of the plurality of events to the client device; and
    in response to determining based on the data that delivering more than the threshold number of events to the client device within the given period of time does not increase the likelihood of the messaging application being uninstalled or the notification for the messaging application being muted, transmitting, over the selected first channel, the first event of the plurality of events to the client device based on the prioritizing of the plurality of events.

2. The method of claim 1, further comprising:
    prioritizing the plurality of channels configured to deliver events to the client device in response to determining that the level of user engagement is below the specified threshold and based on an amount of resources consumed by each of the plurality of channels; and
    selecting the first channel based on prioritizing the plurality of channels.

3. The method of claim 2, further comprising:
    determining that the first channel is associated with a first priority that is greater than a second priority associated with the second channel of the plurality of channels; and
    selecting the first channel for transmitting the first event instead of the second channel in response to determining that the first channel is associated with the first priority that is greater than the second priority.

4. The method of claim 2, further comprising:
    determining that the first event is associated with a first priority that is greater than a second priority; and
    selecting the first channel for transmitting the first event instead of the second channel in response to determining that the first event is associated with the first priority that is greater than the second priority.

5. The method of claim 4, further comprising:
    determining that a second event is associated with the second priority that is lower than the first priority; and
    selecting the second channel for transmitting the second event instead of the first channel in response to determining that the second event is associated with the second priority that is lower than the first priority.

6. The method of claim 1, further comprising:
    determining that a threshold number of events have been transmitted over the first channel after the first channel has been selected; and
    in response to determining that the threshold number of events have been transmitted over the first channel, selecting the second channel to transmit future events instead of the first channel.

7. The method of claim 2, wherein the plurality of channels comprises at least two of the second channel that provides data from a server to the client device in response to a request from the client device to synchronize data with the server, the first channel that comprises a bi-directional connection between the client device and a second client device, or a third channel that provides data from the server to the client device without receiving a request from the client device.

8. The method of claim 7, wherein the second channel operates according to a pull mechanism, wherein the first channel comprises a peer-to-peer link between the client device and the second client device that is persistent, and wherein the third channel operates according to a push mechanism.

9. The method of claim 2, further comprising:
    determining that the first event is associated with a first priority that is greater than a second priority associated with a second event of the plurality of events; and
    selecting the first event for transmission to the client device before the second event in response to determining that the first event is associated with the first priority that is greater than the second priority.

10. The method of claim 1, further comprising selecting a mode of transmission comprising one of a plurality of channels for transmitting the first event to the client device based on determining that the level of user engagement is below the specified threshold.

11. The method of claim 1, further comprising:
    accessing a list of events configured for exclusive transmission to users with low level of engagement with the messaging application; and
    selecting the first event from the list of events.

12. The method of claim 1, further comprising:
    causing a metrics collection system to generate the data, the metrics collection system being implemented on at least one of the client device or a server of the messaging application, wherein the data is generated based on user activity performed on the client device; and
    applying the data to a user engagement model to compute the level of user engagement for the given user.

13. The method of claim 12, wherein the user activity includes at least one of frequency of loading the messaging application on the client device, frequency of sending messages on the client device using the messaging application, recency of accessing the messaging application on the client device, or viewing messages on the messaging application.

14. The method of claim 1, further comprising applying a neural network to identify patterns of user behavior to indicate a likelihood that the user is interested in a conversation or a likelihood that one message is more important than another message.

15. The method of claim 14, wherein the neural network is trained on a per user basis and based on a set of messages that are received in the conversation in which the user is engaged, the likelihood that the user is interested in the conversation or the likelihood that one message is more important than another message being used to associate a priority to the first event for transmission over the selected first channel.

16. The method of claim 1, wherein the level of user engagement is one of a first value indicating the given user is unengaged, a second value indicating the given user has low engagement, a third value indicating the given user has medium engagement, and a fourth value indicating the given user has high engagement, the first value being lower than the second value, the second value being lower than the third value, and the third value being lower than the fourth value.

17. A system comprising:
    a processor configured to perform operations comprising:
        receiving data indicating a level of user engagement with a messaging application for a given user;
        determining that the level of user engagement is below a specified threshold;
        prioritizing, using a trained machine learning model, a plurality of events, associated with the messaging application, for transmission to a client device of the given user in response to determining that the level of user engagement is below the specified threshold;
        in response to determining that the level of user engagement is below the specified threshold,
        selecting a first channel of a plurality of channels instead of a second channel of the plurality of channels over which to transmit one or more events of the plurality of events based on the first channel consuming a greater amount of resources than the second channel;
        in response to determining based on the data that delivering more than a threshold number of events to the client device within a given period of time increases a likelihood of the messaging application being uninstalled or a notification for the messaging application being muted, preventing or delaying transmission of a first event of the plurality of events to the client device; and
        in response to determining based on the data that delivering more than the threshold number of events to the client device within the given period of time does not increase the likelihood of the messaging application being uninstalled or the notification for the messaging application being muted, transmitting, over the selected first channel, the first event of the plurality of events to the client device based on the prioritizing of the plurality of events.

18. The system of claim 17, wherein the operations further comprise:
    determining that a threshold number of events have been transmitted over the first channel after the first channel has been selected; and
    in response to determining that the threshold number of events have been transmitted over the first channel, selecting the second channel to transmit future events instead of the first channel.

19. The system of claim 17, wherein the operations further comprise:
    prioritizing the plurality of channels configured to deliver events to the client device in response to determining that the level of user engagement is below the specified threshold and based on an amount of resources consumed by each of the plurality of channels; and
    selecting the first channel based on prioritizing the plurality of channels.

20. A non-transitory machine-readable storage medium that includes instructions that, when executed by one or more processors of a machine, cause the machine to perform operations comprising:
    receiving data indicating a level of user engagement with a messaging application for a given user;
    determining that the level of user engagement is below a specified threshold;
    prioritizing, using a trained machine learning model, a plurality of events, associated with the messaging application, for transmission to a client device of the given user in response to determining that the level of user engagement is below the specified threshold;
    in response to determining that the level of user engagement is below the specified threshold,
    selecting a first channel of a plurality of channels instead of a second channel of the plurality of channels over which to transmit one or more events of the plurality of events based on the first channel consuming a greater amount of resources than the second channel;
    in response to determining based on the data that delivering more than a threshold number of events to the client device within a given period of time increases a likelihood of the messaging application being uninstalled or a notification for the messaging application being muted, preventing or delaying transmission of a first event of the plurality of events to the client device; and
    in response to determining based on the data that delivering more than the threshold number of events to the client device within the given period of time does not increase the likelihood of the messaging application being uninstalled or the notification for the messaging application being muted, transmitting, over the selected first channel, the first event of the plurality of events to the client device based on the prioritizing of the plurality of events.

* * * * *